Jan. 28, 1930.  F. W. DOUTHITT  1,744,954
CORN CUTTING MACHINE
Filed June 27, 1928    4 Sheets-Sheet 1

Inventor
Frank W. Douthitt
By his Attorneys
Michael Kilgore

Jan. 28, 1930.   F. W. DOUTHITT   1,744,954
CORN CUTTING MACHINE
Filed June 27, 1928   4 Sheets-Sheet 2

Inventor
Frank W. Douthitt
By his Attorneys

Jan. 28, 1930.  F. W. DOUTHITT  1,744,954
CORN CUTTING MACHINE
Filed June 27, 1928  4 Sheets-Sheet 3

Inventor
Frank W. Douthitt
By his Attorneys

Jan. 28, 1930. F. W. DOUTHITT 1,744,954
CORN CUTTING MACHINE
Filed June 27, 1928 4 Sheets-Sheet 4

Inventor
Frank W. Douthitt
By his Attorneys

Patented Jan. 28, 1930

1,744,954

UNITED STATES PATENT OFFICE

FRANK W. DOUTHITT, OF ORTONVILLE, MINNESOTA

CORN-CUTTING MACHINE

Application filed June 27, 1928. Serial No. 288,649.

My present invention has for its object to provide a highly efficient corn cutting machine for use in canning factories and the like for cutting the kernels of corn from cobs for canning or otherwise preserving the same.

To the above end, the invention consists of the novel devices and combinations of devices hereinafter described and defined in the claims.

In the accompanying drawings, which illustrate the invention, like characters indicate like parts throughout the several views.

Referring to the drawings.

Figure 1:
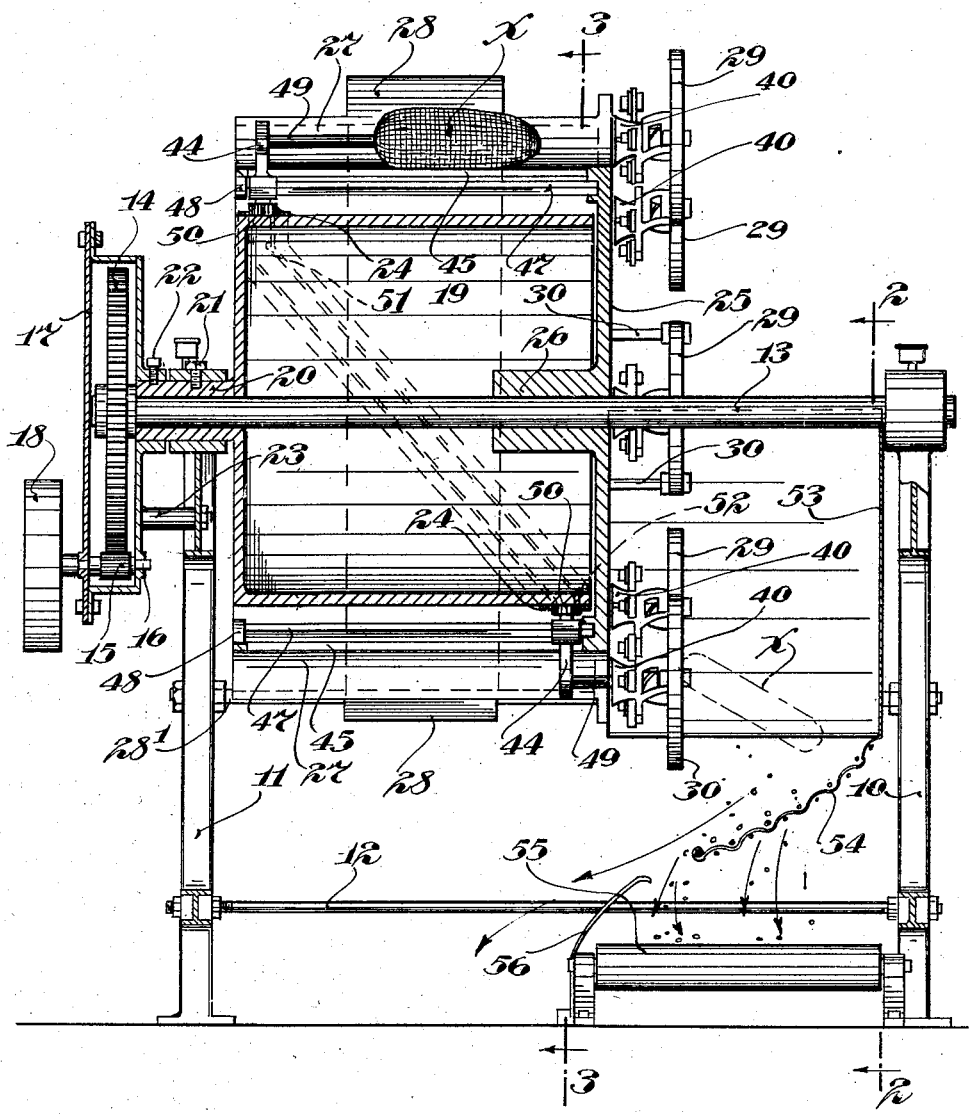
Fig. 1 is a view partly in central vertical section taken from the front to the rear of the machine.
Figure 2:
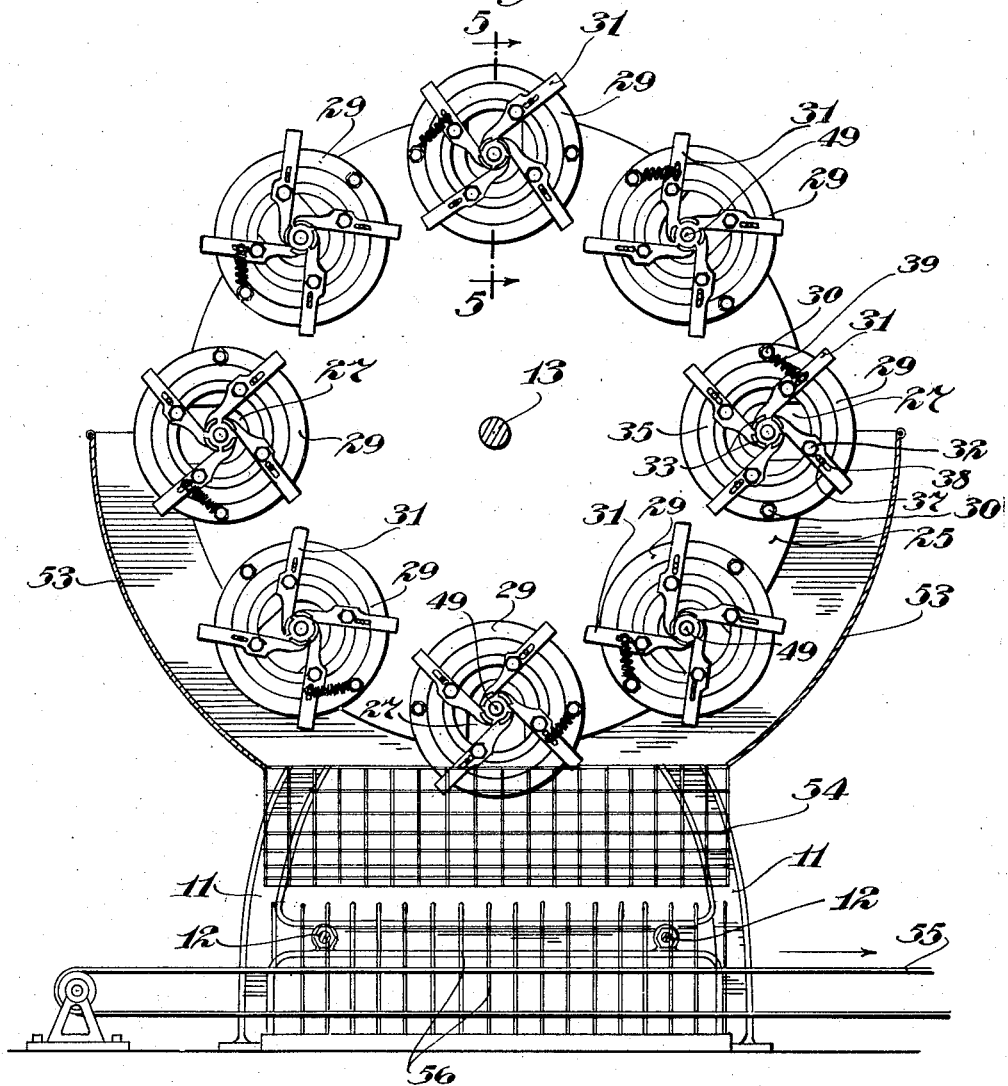
Fig. 2 is a view partly in front end elevation and partly in transverse vertical section taken on the line 2—2 of Fig. 1.

The machine includes cast skeleton front and rear end frames 10 and 11, respectively, rigidly connected by a plurality of longitudinal tie-rods 12. A horizontal shaft 13 is journaled in bearings in the end frames 10 and 11 and a large spur gear 14 keyed to the rear end of said shaft and meshes with a spur pinion 15 on a short shaft 16 journaled in a housing 17 for said gear and pinion. A pulley 18 is secured to the rear end of the shaft 16 outward of the housing 17 and which pulley is operated by a driven belt, not shown.

Surrounding the shaft 13 and concentric therewith is a stationary cylindrical inner drum 19 having an open front end and a closed rear end. On the rear end or head of the drum 19 is a trunnion 20 mounted in the bearing on the end frame 11 and in which trunnion the shaft 13 is journaled. A set screw 21 secures the trunnion 20 to the end frame 11 and holds the drum 19 stationary.

The housing 17 is mounted on the trunnion 20 and held in position thereon by a set screw 22. Said housing 17 is further held in position by an anchoring stud 23 anchored on the end frame 11. On the periphery of the drum 19 and extending completely therearound is an endless cam 24 in the form of a channel and which cam will hereinafter be more specifically referred to.

An outer revoluble drum 25 surrounds the fixed drum 19, is radially spaced therefrom and concentric therewith. Said drum 25 has an open rear end and a closed front end or head with which is formed an inwardly projecting hub 26 keyed to the shaft 13 and supports said drum therefrom. Formed in the periphery of the outer drum 25 is a plurality of circumferentially spaced channel-shaped pockets 27 that extend the full length of said drum in parallel arrangement with each other and to the axis of said drum. The bottoms of the pockets 27 are segmental in cross section and of such diameter as to receive and center ears of corn $x$ placed longitudinally in said pockets.

Figure 3:
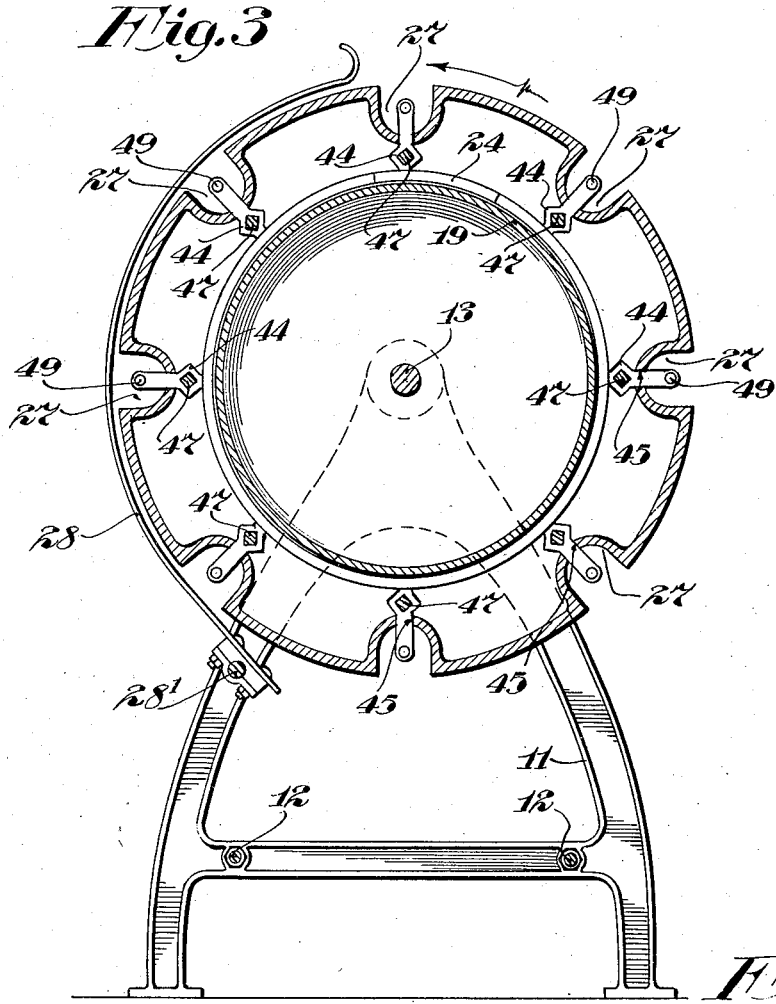
Fig. 3 is a view in transverse vertical section taken substantially on the line 3—3 of Fig. 1.

For holding the ears of corn $x$ in the pockets 27 while being fed to the cutter heads, as will hereinafter appear, there is provided a wide flat retaining spring 28. This spring 28 extends circumferentially around a segment of said drum at the longitudinal center thereof and is anchored at its lower end to a longitudinal rod 28′, which, in turn, is anchored to the end frames 10 and 11. It may be here stated that the drum 25 is rotated in the direction of the arrow marked thereon in Fig. 3 and that the attendant of the machine places the ear of corn $x$ in the pockets 27 on the upwardly rising side of said drum and just before said pockets pass under the retaining spring 28. It will be noted that the free or upper end of the retaining spring 28 is curved away from the periphery of the drum 25 so that the ears of corn $x$ in the pockets 27 may be moved freely thereunder.

A cutter head for each pocket 27 is mounted on the head of the outer drum 25 and which head is the subject matter of my co-pending application executed of even date herewith and entitled "Cutter head for corn cutting machines". As these cutter heads are identical, the one with the other, the description of one will suffice for the others.

Each cutter head includes an annular head place 29 which extends parallel to the outer face of the head of the drum 25 and is rigidly secured thereto and held spaced outward therefrom by a pair of anchor bolts 30. The axis of the head plate 29 is in alignment with the longitudinal center of the segmental bottom of the respective pocket 29. A plurality of levers 31, four being shown, are intermediately pivoted at 32 to the head plate 29 and cutter blades 33 are mounted on the inner end portions of said levers. These cutter blades 33 are formed transversely concave and have long oblique cutting edges 34. Said blades 33 are held by the levers 31 in circumferentially spaced arrangement for contracting and expanding movements about the projected axis of the head plate 29.

By operating the levers 31, the cutter blades 33 may be contracted toward a common center or expanded to vary the size of the passageway therebetween for action on ears of corn of different sizes. For simultaneously operating the levers 31 and hence the cutter blades 33 there is provided an annular shift ring 35 mounted in an annular channel 36 in the outer face of the head plate 29. Perpendicular pins 37 on the shift ring 35 extend through longitudinally extended slots 38 in the outer end portions of the levers 31 and connect said levers to the shift ring 35. The shift ring 35 underlies the levers 31 and is held thereby in its channel 36. A coiled spring 39 anchored to one of the bolts 30 and attached to one of the pins 37 normally and yieldingly holds the shift ring 35 in a position in which the cutter blades 33 are contracted to the smallest diameter of the passageway therebetween.

Co-operating with the cutter blades 33 is a cylindrical depth gauge 40 automatically controlled by an ear of corn passing therethrough to said cutter blades. This depth gauge 40 comprises circumferentially spaced sections, the inner faces of which are transversely concave and have flaring receiving ends for the ears of corn. These sections of the gauge 40 are individually carried by curved arms 41 integrally formed with the inner end portions of the levers 31 between the cutter blades 33 and the pivotal connections 30 for said levers. The sections of the depth gauge 40 are adjustably secured by set screws 42 to their arms 41 to vary the depth to which the cutter blades 33 cut the kernels of the corn from the cobs. Groups of circumferentially spaced knives 43 are carried by the sections of the depth gauge 40 for slitting the kernels of the corn longitudinally of the cob just in advance of the cutting of said kernels from the cob by the cutter blades 33.

For each cutter head is a reciprocatory feed device for moving an ear of corn longitudinally in one of the pockets 27 to the respective depth gauge 40 which by the injection of an ear of corn therein expands said gauge against the action of the spring 39 and thereby automatically positions the slitting knives 43 and cutter blades 33 and finally discharges the cob at the completion of the cutting of the kernels from the cob and ejects said cob from the cutter head 29. This feed device includes a follower 44 which extends radially outward from the periphery of the drum 19 and into the pocket 27 through a longitudinal slot or passageway 45 in the bottom thereof.

Figure 5:
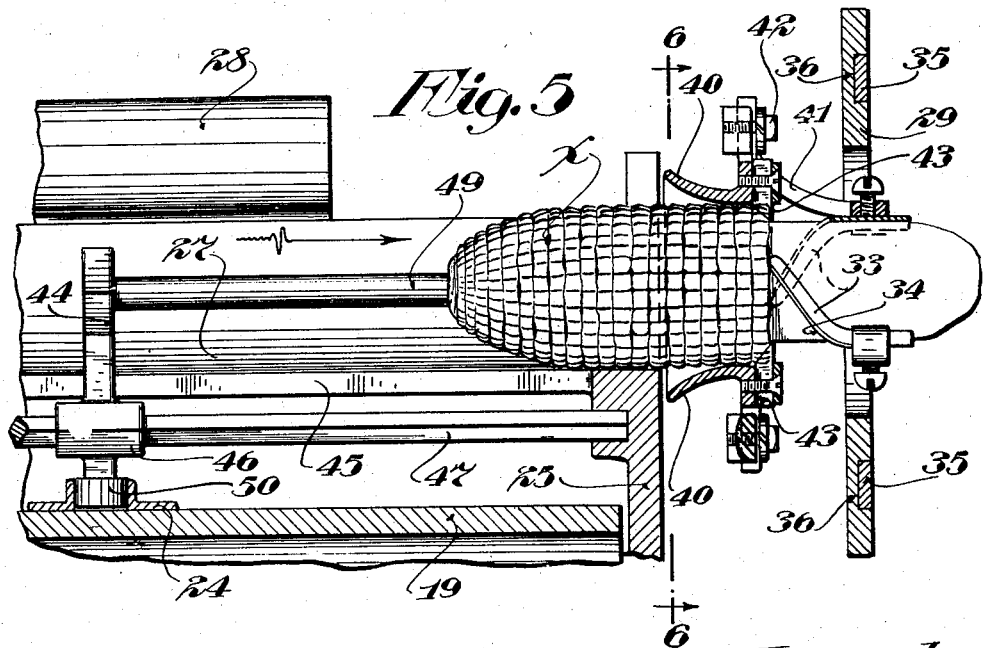
Fig. 5 is a fragmentary detail view with some parts sectioned on the line 5—5 of Fig. 2, on an enlarged scale.

Formed with the follower 44 at the intermediate portion thereof is a relatively long hub 46 slidably mounted on a fixed shaft 47 which extends parallel to the axis of the drum 25. The front end of the shaft 47 is mounted in a seat in the head of the drum 25 and the rear end thereof is mounted in a seat in an internal lug 48 on the rear end of said drum. Said shaft 47 is square in cross section and the passageway in the hub 46 is correspondingly formed to fit thereon and hold the follower 44 from swinging about the axis of said shaft. On the outer end of the follower 44 is a push rod 49 which extends forwardly and longitudinally in the pocket 27 at the center of its segmental bottom and aligned with the axis of the head plate 29 for contact with the rear end of the ear of corn $x$, as shown in Figs. 1 and 5. On the inner end of the follower 44 is a roller-equipped stud 50 which is arranged to travel in the cam channel 24, see Fig. 5, and impart reciprocatory movements to the feed device.

Figure 4:
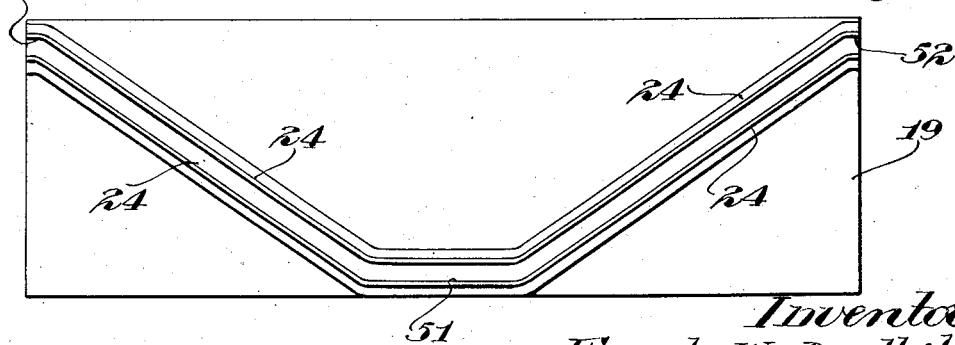
Fig. 4 is a diagrammatic view showing the face of the cam laid out flat.
Figure 6:
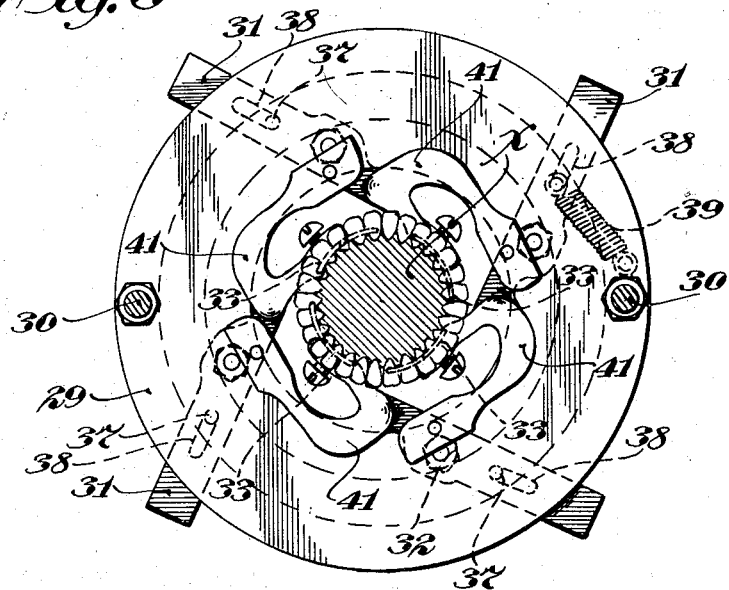
Fig. 6 is a detail view partly in elevation and partly in section taken on the line 6—6 of Fig. 5.

By reference to Fig. 4 it will be noted that the cam channel 24 at the top and rear end of the drum 19 has a section which extends in the direction of the rotation of said drum, as indicated at 51, to cause the feed devices to successively remain stationary for predetermined periods of time at the completion of their retracting movement to permit the placing of an ear of corn in the respective seat 27. Said cam channel 24 at the bottom of the drum 19 and front end thereof is further provided with a relatively short section 52 which extends in the direction of the rotation of said drum so that the feed devices successively remain stationary for a short period of time at the completion of their projecting movements and just before their retracting movements start.

The kernels of corn as they are cut from the cobs and said cobs are received in an open bottom hopper 53 supported between the end frame member 10 and drum 25 below the shaft 13. From this hopper 53 the cut kernels and cobs are precipitated onto a rearwardly inclined screen 54 and separated the one from the other. The cut kernels of corn pass through the sieve 54 or over the lower end thereof and are precipitated onto a travelling conveyor belt 55 and conveyed to a washing machine, not shown, for the purpose of removing pieces of cob, silk, husks, or other foreign matter therefrom prior to canning or otherwise preserving the corn.

The cobs pass over the screen 54 and directed by deflecting fingers 56 into a pit or receptacle therefor.

*Operation*

The operation of the corn cutting machine may be briefly described as follows:

An operator standing at the upwardly rising side of the drum 25 places the ears of corn in the pockets 27 as they are successively brought to the top of said drum under the rotation thereof and at which time the respective feed device is stationary and in its retracted position due to the fact that its roller-equipped stud 50 is in the cam section 51. Under the rotation of the drum 25 in the direction of the arrow indicated in Fig. 3, the ears of corn are carried under the retaining spring 28 and thereby yieldingly held in the pockets 27 with freedom for feeding movement to the cutter heads.

After a pocket 27 has passed under the retaining spring 28 the projecting movement of the feed device is started by the cam 24 and its push rod 49 engages the rear end of the ear of corn $x$ and slides the same forward in the pocket 27 and through the open outer end thereof and into the passageway in the depth gauge 40. As an ear of corn engages the rearwardly flaring end of the gauge 40 the sections thereof are expanded and thereby automatically position the slitting knives 43 and cutter blades 33. The slitting knives 43 and cutter blades 33 are, of course, adjusted, the former to slit the kernels to the proper depth and the latter to cut the kernels of corn from the cobs without undue waste. The peculiar shape of the cutter blades 33 is such as to form a cutting surface surrounding the cob having substantially the same contour. The cutting edges 34 on the cutting blades 33 cut the kernels of corn from the cobs with a drawing action thus making a clean and easy cut. The spring-held shift ring 35 is under strain to contract the gauge 40 onto the exterior of the ears of corn so that the depth gauge follows the contour of the ears of corn both circumferentially and longitudinally, thus causing the cutter blades 33 and slitting knives 43 to always remain in a definite and predetermined cutting relation to the kernels of corn on the cobs.

The speed at which the drum 25 is rotated and the projecting movements of the feed devices is such that ears of corn are fed through the cutter heads during the time said drum makes substantially a one-half rotation so that the kernels have been cut from the cobs and the cob ejected from the cutter head by the feed devices by the time the pockets 27 reach their lowermost positions.

During the final ejecting movements of the cobs from the cutter heads the roller-equipped studs of the feed devices are in the cam section 52 and cause said feed device to remain stationary for a short period of time prior to their retracting movements which is completed in the next following one-half rotation of the drum 25.

The purpose of the retaining spring 28 is to hold the ears of corn in the pockets 27 during the travelling movements thereof in said pockets to the cutter head. The pockets 27 pass from under the retaining spring 28 just prior to the time the cobs are ejected from the cutter heads. The action of the cutter heads and slitting knives are more fully explained in the co-pending application heretofore referred to.

The speed of the machine is such that the pockets 27 are brought into receiving positions just as fast as an operator can place the ears of corn therein and which ears, due to the shape of said pockets, are automatically aligned with the cutter heads. From the cutter heads the cut kernels and cobs are separated as previously described and said kernels conveyed to a washing machine or wherever wanted.

What I claim is:

1. In a machine of the class described, a cutter head, means for positioning an ear of corn in respect to the cutter head, and a reciprocating feed device for moving a positioned ear to the cutter head during the projecting movement of the feed device, said feed device being held in neutral position for a predetermined period of time at the completion of its retracting movement.

2. In a machine of the class described, concentric inner and outer drums, the former of which is fixed and the latter of which is rotatable, circumferentially spaced positioning pockets in the periphery of the outer drum for ears of corn, cutter heads mounted on the outer drum and arranged to receive the positioned ears from the pockets, reciprocatory feed devices mounted on the outer drum for moving the positioned ears in the pockets to the cutter heads, an endless cam on the inner drum for reciprocating the feed devices.

3. The structure defined in claim 2 in which the cam is arranged to hold the feed devices in neutral position for a predetermined period of time at the completion of their retracting movements.

4. The structure defined in claim 2 in further combination with yielding means for holding the positioned ears in the pockets during a portion of the rotation of the drum.

5. The structure defined in claim 2 in which the feed devices are adapted to successively eject the cobs of said ears from the cutter heads.

6. A device of the class described, comprising means for simultaneously moving a plurality of ears of corn laterally and longitudinally, and means for removing the kernels from the ears by the longitudinal movement thereof.

7. A device of the class described, comprising means for laterally conveying ears of corn, means for feeding ears transversely of said conveying means, and means for removing the kernels from said ears when said ears are moved transversely of the conveying means.

8. The structure defined in claim 7 including means for automatically adjusting said kernel removing means in proportion to the size of the ears.

9. In a machine of the class described, a travelling carrier having pockets for ears of corn, feed adjustable cutter heads mounted outward of each pocket to travel with the carrier and arranged to receive positioned ears from the pockets, and means for progressively feeding positioned ears from the pockets to the cutter heads and discharging the cobs therefrom during travel of the carrier.

10. In a machine of the class described, a revolvable carrier having positioning pockets for ears of corn, a cutter head mounted to travel with said carrier and arranged to receive positioned ears from said pockets, means for holding the ears in said pockets during a portion of the rotation of said carrier, a feeding means for the ears comprising a follower having a push rod extending into each pocket, and means for progressively operating said feeding means to cause the push rods to engage the ears of corn held within the pockets.

11. The structure defined in claim 10 in which the push rods eject the cobs of said ears outward from the cutter heads at the completion of the cutting of the kernels therefrom.

12. In a machine of the class described, a revolvable drum having circumferentially spaced pockets for positioning ears of corn, adjustable cutter heads mounted outward of each pocket to travel with the drum and arranged to receive positioned ears from the pockets, feed devices carried by the drum for moving positioned ears from the pockets to the cutter heads, means for operating the feed devices, and means aligned with each pocket and operatively connected with said cutter heads for independently adjusting said cutter heads in proportion to the size of the ears during rotation of the drum.

13. The structure defined in claim 12 in which the means for operating the feed devices includes an endless cam.

14. A machine for conveying ears of corn and simultaneously cutting the kernels from the cobs, comprising a conveyor having spaced ear receiving pockets, adjustable cutter heads carried by said conveyor outward of each pocket, means carried by said conveyor and operable by the travel thereof for progressively feeding ears from said pockets to said cutter heads and discharging the cobs therefrom, and means aligned with each pocket and disposed between the cutter heads and conveyor for automatically adjusting said cutter heads.

15. A machine of the class described, comprising a travelling carrier having spaced pockets for ears of corn, a cutter head having automatically adjustable knives mounted outward of each pocket to travel with said carrier, means for progressively feeding positioned ears from said pockets to said cutter heads during a portion of the travel of said carrier, and means mounted outwardly of said carrier and arranged to receive cut kernels of corn from said cutter heads.

16. A machine of the class described, comprising a pocketed endless carrier for ears of corn, means for progressively feeding the ears of corn transversely of the carrier during a portion of the travel thereof, and ear controlled cutter heads mounted outward of each pocket to travel with said carrier, said feeding means discharging the cobs from the cutter heads upon the completion of the cutting operation.

17. A machine for conveying ears of corn and simultaneously cutting the kernels from the cobs, comprising a pocketed conveyor, adjustable cutter heads aligned with the pockets thereof, means carried by the conveyor and operable by the travel thereof for progressively feeding and discharging ears from the pockets through the cutter heads, and means responsive to the size of the ears fed from said pockets for independently adjusting said cutter heads.

18. In a machine of the class described, a revolvable carrier having circumferentially spaced pockets for receiving and guiding ears of corn, a cutter head mounted on said carrier adjacent one end of each pocket, knives adjustably carried by said cutter heads, a depth gauge aligned with each pocket and operatively connected with the knives of the adjacent cutter head, and means operable by the rotation of said carrier for progressively feeding and discharging ears of corn from said pockets through said depth gauge and cutter heads.

In testimony whereof I affix my signature.

FRANK W. DOUTHITT.